April 5, 1966     A. C. COGGESHALL     3,244,485
APPARATUS FOR PREPARING POLYCARBONAMIDES
Original Filed July 17, 1962
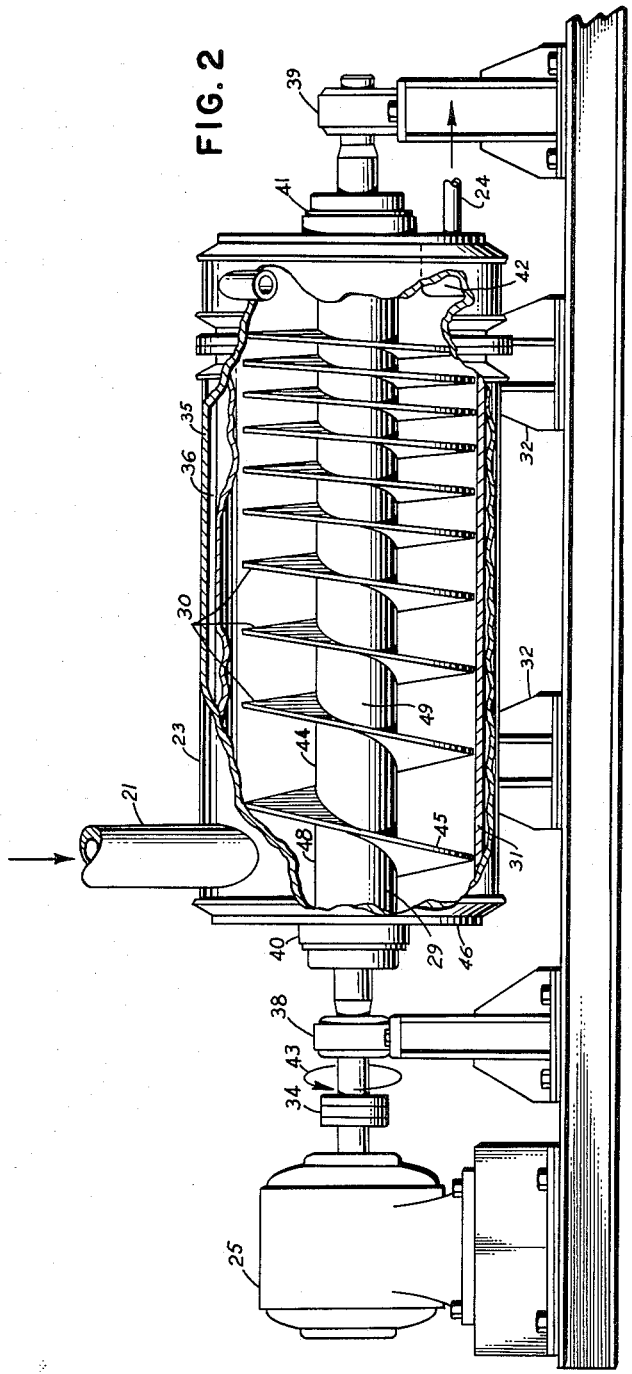
FIG. 2
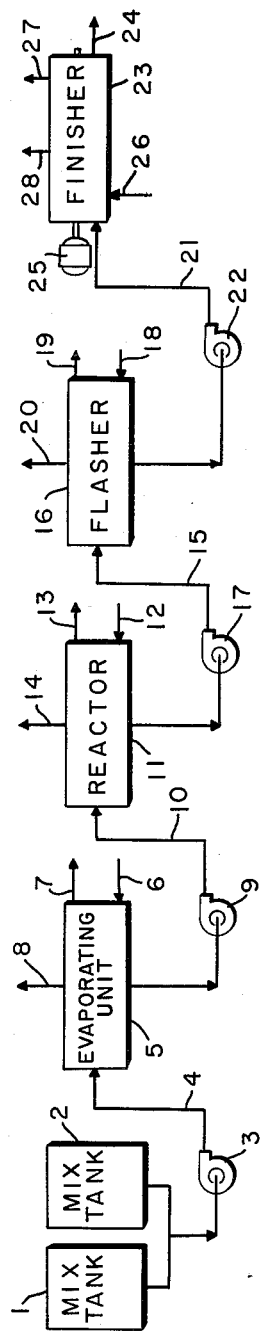
FIG. 1.
INVENTOR.
ALVA C. COGGESHALL
BY 
ATTORNEY

United States Patent Office 3,244,485
Patented Apr. 5, 1966

3,244,485
APPARATUS FOR PREPARING POLY-
CARBONAMIDES
Alva C. Coggeshall, Pensacola, Fla., assignor to Monsanto Company, a corporation of Delaware
Continuation of abandoned application Ser. No. 210,463, July 17, 1962. This application Feb. 4, 1965, Ser. No. 432,071
6 Claims. (Cl. 23—260)

This application is a continuation of application Serial No. 210,463 filed July 17, 1962 and now abandoned.

This invention relates to a process for and an apparatus used in the preparation of high molecular weight polymers, especially to those prepared by condensation-type reactions, such as polyamides, polyesters, and the like. More particularly, this invention relates to a process for and an apparatus used in the continuous preparation of linear polycarbonamides of a type characterized by a high molecular weight, including those particularly useful in the formation of shaped articles such as fibers, filaments, and the like.

The production of linear condensation polymers from polymer forming reactants has assumed increasing commercial importance throughout various industries. In the formation of such linear polymers, particularly those of the type having properties which include film and fiber forming properties, the polymeric end product may be a polycarbonamide which is formed from liquid compositions comprising polycarbonamide forming reactants.

In one example of the formation of polycarbonamides, such as nylons and the like, a solution of a polyamide forming composition which usually contains water or other solvent is subjected to superatmospheric pressures and polyamide forming temperatures to carry out the polycondensation or polyamide forming reaction. As the polycondensation of polyamide forming compositions progresses, the viscosity of the polyamide reaction mass increases in a well-known manner, and it has been found that with the use of heretofore known polymerization apparatus, portions of the viscous reaction mass tend to remain in a relatively stagnant or physically inert condition, particularly in the latter stages of the polycondensation process wherein the mass is ordinarily subjected to a reduced energy climate. This polycondensation climate, together with the increasing viscosity of the mass, tends to inhibit the efficient performance of the polycondensation process in that the poly-joining of amine ends with carboxyl ends is greatly impeded and in that considerable difficulty is experienced in removing the water of reaction from the reaction mass. As a result of the inclination of the water of reaction to remain engaged in the mass, there is a tendency for the polycondensation process to reverse or not to proceed to normal completion, thereby producing a polyamide end product of inferior quality.

Further, difficulties have been encountered in the use of present day polycondensation apparatus, not only as a result of the enervating climate inherently induced by the use of the known apparatus and to which the reaction mass is subjected, but also as a result of inferior heat transfer conditions common to such apparatus. Because of these drawbacks, it has been found that the reaction mass must be maintained at a high temperature for long periods of time in order to insure evaporation of volatile products and a favorable completion of the polycondensation reaction. Maintaining polymer forming compositions such as those described above at a high temperature for a relatively long period produces thermal degradation or degeneration of the resultant polymer. In addition, as the polymerization process nears completion and the viscosity of the reaction mass approaches its desired optimum value, the heat applied to the mass may create an excess of polymerization, undesirable side reactions, or both, which may result in clusters of obnoxious material commonly referred to as "gels." Although the chemical composition of these gels is not understood precisely, it is known that these gels are objectionable and cause a substantial reduction in the quality of the polymeric end product. Various structures have been proposed to maintain the reaction mass in a turbulent state and to promote heat transfer conditions, particularly during the last stages of polymerization, but all of these have failed to overcome the gelation problem. Furthermore, thermal degradation of the polymer is still encountered.

It is well known that in the final stages of the polycondensation, the viscous liquid and the ambient gas tend to limit the elimination of water or a like product of reaction from the liquid phase to the gas phase. As indicated above, disengagement of water from the reaction mass is critically important in carrying out the polycondensation process successfully. It is, therefore, highly desirable that a maximum holding time be obtained in the finishing system to promote the elimination of water or like material resulting from the union of molecules undergoing polycondensation and to increase the efficiency of the polycondensation process and the apparatus used therefor.

It is, therefore, a primary object of this invention to provide a new and novel apparatus and process for the manufacture of synthetic polymers.

Another object of this invention is to provide a new and novel apparatus and process for making high quality synthetic linear polycondensation polymers such as polycarbonamides, and particularly those having film and fiber forming properties.

Still another object of this invention is to provide a new and novel apparatus and process for preparing synthetic linear polycondensation polymers which reduces or eliminates thermal degradation and gelatinous formations in the polymer forming reaction masses.

A further object of this invention is to provide a new and novel apparatus and polymerization process for producing synthetic linear polymers in which a polycondensation process can be carried out in an efficient manner by utilization of minimum size equipment and which gives a polymeric end product substantially free of objectionable material such as gels and the like.

This invention further contemplates the provision of a new and novel apparatus and process for forming synthetic polycondensation polymers such as polyamides which is characterized by increased holding time of the polymer forming reaction masses in the final stages of the polymerization.

A still further object of the invention is to provide a new and novel apparatus and process for producing significantly more synthetic polycondensation polymers from equipment of a given size.

A still further object of the invention is to provide a new and novel apparatus and process for making synthetic linear polymers which permits maximum utilization of the volume within the apparatus for carrying out one of the operations in the polymerization process.

Other objects and advantages of the invention will become apparent from the following description thereof taken in connection with the accompanying drawing.

The objects of the invention are accomplished by providing a polymer forming reaction mass which, in the preferred specific embodiment, includes an aqueos solution of a diamine-dibasic carboxylic salt. In the initial phases of the novel process, the reaction mass is subjected to an elevated temperature and a suitable pressure to evaporate some of the water of solution from the reaction mass.

The residue of evaporation is subjected to conditions to convert progressively the major portion of the reaction mass to a polycondensation product while removing the water of reaction or like substance produced as the result of the union of the molecules of the reaction mass. This resultant polymerized reaction mass which is capable of undergoing further conversion to a higher molecular weight polymer is conducted continuously through a vessel wherein sufficient heat is applied to the system to remove the water of reaction or like substance from the system as a gas.

Because of the high viscosity of the reaction mass at this point in the system, it is necessary that a maximum holding time of the mass be obtained so that the bubbles of steam or like gaseous substance will be permitted to rise through the viscous reaction mass and be removed, thereby preventing a reaction equilibrium from being set up. Also, because of markedly increasing viscosity of an already viscous mass within the reaction vessel at this stage of the process, it is critically important that the viscous mass entering this stage of the process does not run by the more viscous mass about to exit and thereby reduce the holding time of the reaction mass within this stage of the system. If this is permitted, insufficiently polymerized material mixed with gel and thermally degraded material will be obtained from the process.

The maximum holding time of the reaction mass within this stage of the system and the prevention of run-by of the more viscous material exiting by the lower viscosity material entering are obtained by means of an apparatus comprising a horizontal vessel containing a screw pumping device which rotates upon an axis essentially parallel to the direction of flow of the reaction mass through the vessel. The screw pumping device comprises a shaft with screw flights extending therefrom with the said flights having a variable pitch. The pitch of the flights varies essentially according to the equation wherein the pitch between two adjacent flights on the screw device times the density of the reaction mass contained therebetween equals or approximates a constant.

The novel features which are believed to be characteristic of the invention are set forth with particularity in the appended claims. The invention itself, however, both as to its organization and method of operation, may be understood best by reference to the following description taken in conjunction with the accompanying drawing in which:

FIGURE 1 is a flow chart or diagram illustrating a polymerization process carried out in accordance with the invention; and, FIGURE 2 is a vertical view, partially cut away, of a device embodying one form of the invention and is a part of the finisher as shown in the flow diagram of FIGURE 1.

Although, in general, any suitable polymer forming composition may be processed with the novel method of this invention, those materials capable of undergoing polycondensation to produce polymers of high molecular weight, e.g. those having fiber forming characteristics, are preferably processed. It is with reference thereto that the novel method of this invention will be described exemplarily. Polymer forming compositions suitable for preparing fiber forming polymers in accordance with this invention may be of a type from which polyhexamethylene adipamides are prepared, and it is for the preparation of polycarbonamides, which include the commercially produced nylons, that the description of the invention will be directed specifically hereinafter.

With reference now to FIGURE 1, there is shown schematically by means of a flow chart or diagram one embodiment of the novel method for making linear polymers contemplated by the invention. The polymerization apparatus employed to carry out the process of FIGURE 1 comprises a pair of containers or mix tanks 1 and 2 in which proper proportions of the constituents comprising the polymer forming composition or reaction mass may be placed initially and mixed uniformly if desired. As an example of polymer forming compositions, the reaction mass within the mix tanks 1 and 2 may comprise a mixture of organic primary or secondary diamine and organic dibasic carboxylic acid, salt thereof, or a polymerizable monoamino organic acid. It should be understood that the method of the invention may be practiced more advantageously by providing initially the polyamide forming composition in aqueous solution form. For instance, a 45 to 50% or higher aqueous solution of hexamethylene diammonium adipate may be provided when it is desired to store the solution at or near room temperature under atmospheric pressure.

By a means such as pump 3, positioned within a feed line 4, the solution of polyamide forming salt or reaction mass is conveyed to an evaporating unit 5, or like means for expelling water by heat, through which the mass is moved continuously. In this operation the concentration of the polymer forming material in the aqueous solution is increased to the range of 60 to 75% by weight or more. The evaporating unit 5 may be of any of the known heat exchanger types such as a shell and tube evaporator in which heat is supplied to the reaction mass by means of a suitable heating medium such as Dowtherm vapors, steam, or the like. The heating medium may be moved continuously through the unit 5 by means of inlet 6 and outlet 7. Preferably, the reaction mass in the evaporating unit is agitated by a suitable means (not shown) to improve the heat transfer conditions and water expulsion. The evaporated water of solution or vapor is removed from unit 5 through outlet 8.

For example, the solution of polyamide forming salt may be heated in the evaporating unit to a temperature of approximately 105 to 115° C. for approximately 20 to 30 minutes at suitable pressures to bring about this concentration. Depending upon the conditions of temperature and pressure in the evaporating unit, oligomerization of the reaction mass may begin therein also.

The reaction mass concentrated in the evaporating unit 5 may be removed continuously therefrom by a means such as pump 9 and conducted through a feed line 10 to an autoclave or reactor 11. In the illustrated embodiment, reactor 11 preferably is similar to the evaporating unit 5 and may be, therefore, of the shell and tube type through which the reaction mass is moved continuously while heat is applied to the mass. In order to obtain polycondensation of the salt of adipic acid and hexamethylene diamine, the reaction mass may be pressurized within reactor 11 to a pressure of approximately 240 to 260 pounds per square inch and may be heated to an elevated polyamide forming temperature of approximately 235° C. As in evaporating unit 5, the mass in the reactor preferably may be heated by a heating medium which may be moved continuously through the system by inlet and outlet conduits 12 and 13 respectively, and the mass undergoing polycondensation may be agitated to improve the heat transfer conditions. The volatile products, including residual water of solution and the water of reaction produced in the reactor during polycondensation, may be removed through reactor outlet 14.

At the superatmospheric pressure and polyamide forming temperature existing within the reactor 11, a large percentage of the reaction mass moving continuously therethrough may be polycondensed and converted to a low molecular weight polyamide. Although the dwell time of the reaction mass in the reactor 11 is selected in accordance with the particular process to be carried out, in one polymerization process practiced in accordance with this invention, a dwell time of approximately two hours is advantageous.

After sufficient dwell of the polymer reaction mass in reactor 11, the partially polymerized material may be removed continuously from the reactor and conveyed through line 15 to a pressure reduction unit or flasher 16 by pump 17. The partially polymerized reaction mass within flasher 16 may be quickly and continuously brought to substantially atmospheric pressure, and occluded water or like polymerization by-product in the liquid phase within the mass is evaporated or flashed from the mass permitting an increase in the degree of polymerization of the mass. The occluded water or like polymerization by-product may be removed from flasher 16 by line 20. At the same time, it is preferred that a predetermined amount of heat is supplied to the mass to replace the heat lost during the flashing operation. This heat may be supplied by a suitable heating medium flowing through the inlet and outlet conduits 18 and 19 respectively.

It should be understood that the above described steps of the polymerization process incorporated in the novel process of this invention are well known and have been practiced generally throughout the industry. The pressure and temperature values as well as the particular sequence of steps referred to above are for illustrative purposes only and departures therefrom may be made within the scope of the invention to obtain the partially polymerized reaction mass which is discharged from flasher 16. Furthermore, it should be understood that the mass leaving the flasher is not polycondensed completely, and further polycondensation resulting in a higher molecular weight polymer is necessary for a satisfactory end product.

The partially polymerized reaction mass at this stage is extremely viscous and difficult to handle. In accordance with the present invention, means have been provided for completing the polymerization of the reaction mass efficiently and with maximum utilization of equipment to obtain a polycarbonamide of extremely high quality free from all gel and thermally degraded polymer.

More specifically, the partially polymerized reaction mass may be conducted through line 21 by pump 22 to another unit or finisher 23. The reaction mass may be moved continuously therethrough in a manner such that maximum holding time of the reaction mass will be obtained therein by maximum utilization of the volume available within the finisher 23, and polymer of the desired molecular weight may exit at line 24. Heat may be supplied to the reaction mass within finisher 23 by a suitable heating medium which may enter the finisher system at 26 and leave at 27. In the preferred example of the polymerization of polyhexamethylene adipamide sufficient heat should be supplied to maintain the polymer within the finisher at a temperature of 230° C. to 300° C. The vapors from the reaction mass formed within finisher 23 may be removed through outlet 28.

In the continuous polymerization of nylon and other like condensation polymers, the final step of the process may be accomplished by a finishing unit which is basically a horizontal cylindrical vessel through which the reaction mass is moved by an unfilled screw conveyer. The unfilled screw conveyer generally operates so as to segregate a particular part of the reaction mass between two adjacent flights of the screw conveyer and move this portion of the mass forward at a rate which corresponds to the product of the distance between adjacent flights of the screw, or pitch, times the rate of rotation of the screw conveyer. The reaction mass completes its polymerization to the desired molecular weight as it moves.

Referring now to FIGURE 2, there is shown in detail a finisher which embodies one form of the invention. Finisher 23 comprises a cylindrical vessel 35 suitably supported in a horizontal position by support member 32, an inner cylindrical vessel 31 forming an annular space 36 between vessels 35 and 31, a screw pumping device 44 having screw flights 30 thereon, and a pump 42 for discharging polymerized mass from the finisher. Screw pumping device 44 may be rotated on its major axis by drive mechanism 25 which operates through coupling 34 to rotate screw pumping device 44 in the direction shown at 43. Bearings 38 and 39 may be provided to support and permit rotation of screw pumping device 44, and seals 40 and 41 may be provided to prevent leakage into or out of the finisher.

Reaction mass may enter the finisher through line 21, be moved horizontally by successive flights 45 by the rotation shown at 43, and be discharged from the finisher by pump 42 through line 24. A suitable heating medium such as Dowtherm vapors or steam may enter the annular space 36 by line 27 and exit by a line (not shown) to give good circulation of the medium. The gas resulting from further polycondensation of the reaction mass within the finisher may be removed by a line (not shown) generally located at the top of the finisher and vacuum may be used to aid in the removal of the gas.

In operation, the finisher is operated preferably in an unfilled condition. The flow of reaction mass into the finisher through line 21 is controlled so that the level of the mass between the end of the finisher 46 and the first flight 45 never exceeds the top of the screw shaft 49 shown at 48. In this manner then, a segmented portion of the reaction mass is moved positively to the outlet pump 42.

The holding time of the polymer within the finisher is critical in order to obtain the desired degree of polymerization of the reaction mass, and in the case of polyhexamethylene adipamide polymer the holding time may be from 0.5 hour to 3 hours, depending upon the degree of polymerization desired. The standard unfilled constant pitch screw conveyer operates more or less in a manner similar to a positive displacement pump which moves a particular segregated section of the reaction mass through the finisher at a constant linear velocity. The density of the reaction mass in the finisher increases from the inlet to the outlet ends as the polymerization continues and vapor disengagement proceeds. In the polymerization of nylon, specific gravities in the range of 0.30 to 0.38 are common for the reaction mass at the inlet of the finisher and specific gravities of 0.47 to 0.54 may be found at the outlet of the finisher.

Since the density of the segregated portion of the reaction mass increases markedly as it moves through the finisher, the liquid level of the segregated portion of the reaction mass decreases markedly as it moves through a standard unfilled constant pitch screw finisher. In an example wherein the specific gravity of a segregated portion of the reaction mass increased from 0.305 at the inlet to 0.478 at the outlet, the liquid level of the segregate portion decreased so that the ratio of the volume of segregated portion of the reaction mass at the inlet to the volume of the same segregated portion at the outlet was approximately 1.8 to 1.0.

It can be seen readily that, if a desired holding time of the reaction mass is to be maintained to obtain the desired degree of polycondensation of the reaction mass, the rate of rotation must be maintained constant which in turn will limit the throughput of the reaction mass to approximately one-half of that which is possible with a finisher of a given volume.

By this invention whereby the pitch of the screw conveyer is varied according to the equation wherein product of the pitch between the flights of the screw conveyer times the density of the reaction mass between the flights of the screw for which the pitch is measured equals a constant, the liquid level of the reaction mass within the finisher can be maintained at an essentially constant level from the inlet to the outlet, and there is maximum utilization of the volume available within the finisher. Rotational speeds of the screw conveyer can be increased markedly while maintaining holding time of the reaction mass within the finisher at the desired level, volume output of polymerized material of the desired quality can be increased markedly, and better heat transfer conditions are maintained within the finisher which prevent gel formation and thermal degradation of the polymer.

As many apparently widely different embodiments of this invention may be made without departing from the spirit and scope thereof, it is to be understood that I do not limit myself to the specific embodiments thereof except as defined in the appended claims.

What is claimed is:

1. An apparatus for producing polycarbonamides comprising in sequential arrangement mixing means for preparing solvent solution of polycarbonamide reactants; evaporating means for concentrating prepared solvent solution of polycarbonamide reactants; reactor means for reacting resulting concentrated solvent solution at elevated temperature and pressure; flasher means for returning resulting reacted solution substantially adiabatically to substantially atmospheric pressure; and horizontal finisher means having horizontal screw device for moving segregated portions of said resulting reacted solution substantially horizontally at elevated temperature and substantially atmospheric pressure, said horizontal screw device having flights for segregating said segregated portions and the pitch between said flights decreasing incrementally in the direction of horizontal movement of said segregated portions.

2. The apparatus of claim 1 wherein said pitch decreases in accordance with the equation $P=K/d$ wherein, P is the pitch between adjacent flights, K is the product of the density of the first segregated portion of said reacted solution upon entry into horizontal finisher, and the pitch between the two flights segregating said first segregated portion, and $d$ is the density of said reacted solution in any segregated portion for which P is to be determined.

3. An apparatus for continuous production of polyhexamethylene adipamide comprising in sequential arrangement mixing means for preparing an aqueous solution of hexamethylenediamine and adipic acid in substantially equal quantities; evaporating means for concentrating prepared aqueous solution of hexamethylene diammonium adipate; reactor means for polymerizing concentrated aqueous solution of hexamethylene diammonium adipate at a temperature of 220° C. to 250° C. and a pressure of 240 to 260 pounds per square inch; flasher means for returning resulting low molecular weight polyhexamethylene adipamide substantially adiabatically to substantially atmospheric pressure; and horizontal finisher means for continously moving substantially segregated portions of said low molecular weight polyhexamethylene adipamide horizontally for a period of 0.5 hour to 3.0 hours at a temperature of 250° C. to 300° C. and a pressure not substantially greater than atmospheric, said horizontal finisher means having a horizontal continuous screw device comprising a horizontal rotatable shaft having screw flights extending therefrom for segregating and moving said segregated portions of said low molecular weight polyhexamethylene adipamide horizontally and said screw flights being constructed and arranged to provide a pitch between adjacent flights in accordance with the formular $P=K/d$ wherein P is the pitch between said adjacent flights, $d$ is the density of polyhexamethylene adipamide between said adjacent flights for which $p$ is to to be determined, and K is a constant equal to the product of density of said low molecular weight polyhexamethylene adipamide entering said horizontal finisher means and the pitch between adjacent screw flights segregating the first segregated portion of said polyhexamethylene adipamide within said horizontal finisher means.

4. The apparatus of claim 3 having a control means for regulating the flow of said low molecular weight polyhexamethylene adipamide to said finisher means to maintain the level of said low molecular weight polyhexamethylene adipamide in said first segregated portion not substantially above said horizontal rotatable shaft.

5. The apparatus of claim 4 wherein said horizontal finisher has a vapor exit means located above said horizontal rotatable shaft for removing water vapor from the vapor space above the level of polyhexamethylene adipamide within said horizontal finisher.

6. An apparatus for continuous production of polyhexamethylene adipamide comprising a heated horizontal finisher means having a horizontal continuous screw device, said screw device comprising a horizontal rotatable shaft with screw flights extending therefrom for segregating and moving segregated portions of viscous liquid polyhexamethylene adipamide horizontally, said screw flights being constructed and arranged to provide a pitch between adjacent flights in accordance with the formula $P=K/d$ wherein P is the pitch between said adjacent flights, $d$ is the density of said viscous liquid polyhexamethylene adipamide between said adjacent flights for which $p$ is to be determined, and K is a constant equal to the product of the density of said liquid polyhexamethylene adipamide entering said heated horizontal finisher means and the pitch between adjacent screw flights segregating the first segregated portion of said viscous liquid polyhexamethylene adipamide within said heated horizontal finisher means; and control means for regulating the flow of said viscous liquid polyhexamethylene adipamide to said finisher means to maintain the level of said viscous liquid not substantially above said horizontal rotatable shaft.

References Cited by the Examiner
UNITED STATES PATENTS

| | | | |
|---|---|---|---|
| 3,113,843 | 12/1963 | Li | 23—285 |
| 3,118,739 | 1/1964 | Atkinson et al. | 23—285 |

References Cited by the Applicant
UNITED STATES PATENTS

| | | |
|---|---|---|
| 2,480,615 | 8/1949 | Strain et al. |
| 2,833,750 | 5/1958 | Vickers. |
| 2,908,666 | 10/1959 | Notarbartolo. |

MORRIS O. WOLK, *Primary Examiner.*

JAMES H. TAYMAN, JR., *Examiner.*